US010703358B2

(12) United States Patent
Ransberger et al.

(10) Patent No.: US 10,703,358 B2
(45) Date of Patent: Jul. 7, 2020

(54) METHOD FOR THE QUALITY ASSURANCE OF EXHAUST GAS BEHAVIOR IN A MOTOR VEHICLE

(71) Applicant: Bayerische Motoren Werke Aktiengesellschaft, Munich (DE)

(72) Inventors: Marinus Ransberger, Irschenberg (DE); Christian Flenker, Zorneding (DE); Christian Garcon, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 198 days.

(21) Appl. No.: 16/043,277

(22) Filed: Jul. 24, 2018

(65) Prior Publication Data
US 2018/0326972 A1    Nov. 15, 2018

Related U.S. Application Data

(63) Continuation of application No. PCT/EP2017/051287, filed on Jan. 23, 2017.

(30) Foreign Application Priority Data

Jan. 25, 2016  (DE) .......................... 10 2016 200 984

(51) Int. Cl.
 *B60W 10/06* (2006.01)
 *B60W 10/08* (2006.01)
 (Continued)

(52) U.S. Cl.
 CPC ............ *B60W 20/16* (2016.01); *B60W 10/06* (2013.01); *B60W 10/08* (2013.01); *B60W 20/40* (2013.01);
 (Continued)

(58) Field of Classification Search
 CPC ...... B60W 10/00; B60W 10/06; B60W 10/08; B60W 20/00; B60W 20/16; F01N 11/00; F02D 41/00; F02D 41/22
 See application file for complete search history.

(56) References Cited

U.S. PATENT DOCUMENTS 5,033,440 A * 7/1991 Kumagai ............ F02D 41/1479
 123/680
5,809,973 A * 9/1998 Iida .................... F02D 41/0087
 123/491
 (Continued)

FOREIGN PATENT DOCUMENTS

CN     102435446 A      5/2012
DE     102 54 843 A1    6/2004
 (Continued)

OTHER PUBLICATIONS

Chinese-language Office Action issued in Chinese Application No. 201780004669.X dated Oct. 9, 2019 (five (5) pages).
 (Continued)

Primary Examiner — Yonel Beaulieu
(74) Attorney, Agent, or Firm — Crowell & Moring LLP

(57) ABSTRACT

A method for the quality assurance of exhaust gas behavior in a motor vehicle, particularly in a hybrid vehicle, includes monitoring an on-board-diagnosis function; providing a journey counter a diagnosis counter, and a nominal diagnosis frequency value; incrementing the journey counter following the beginning of a driving cycle; generating an actual diagnosis frequency value using a combination of the diagnosis counter and the drive counter; and establishing a difference between the nominal diagnosis frequency value and the actual diagnosis frequency value. If the difference falls short of a threshold: a control method is selected, which is designed to successfully complete a currently running OBD of the OBD function and to initiate and complete a
 (Continued)

non-running OBD. Following the completion of the OBD of the OBD function, the diagnosis counter is incremented and the motor control restored to an original motor control.

20 Claims, 5 Drawing Sheets

(51) Int. Cl.
    *B60W 20/40*     (2016.01)
    *F01N 11/00*     (2006.01)
    *F02D 41/22*     (2006.01)
    *B60W 20/16*     (2016.01)
    *F02D 41/24*     (2006.01)

(52) U.S. Cl.
CPC .............. *F01N 11/00* (2013.01); *F02D 41/22* (2013.01); *B60W 2530/18* (2013.01); *B60W 2710/0644* (2013.01); *B60W 2710/0666* (2013.01); *B60W 2710/0677* (2013.01); *B60W 2710/081* (2013.01); *B60W 2710/083* (2013.01); *B60W 2710/086* (2013.01); *B60W 2720/10* (2013.01); *B60Y 2200/92* (2013.01); *F01N 2550/00* (2013.01); *F01N 2590/11* (2013.01); *F01N 2900/0421* (2013.01); *F01N 2900/102* (2013.01); *F01N 2900/16* (2013.01); *F02D 41/2403* (2013.01); *Y02T 10/40* (2013.01); *Y02T 10/47* (2013.01)

(56) References Cited

U.S. PATENT DOCUMENTS

| | | | | |
|---|---|---|---|---|
| 6,230,487 | B1* | 5/2001 | Blumenstock | B01D 53/9495 60/277 |
| 9,239,577 | B2* | 1/2016 | Montvay | F02D 41/221 |
| 9,581,099 | B1* | 2/2017 | Szailer | F02D 41/0235 |
| 2012/0072060 | A1 | 3/2012 | Zettel et al. | |
| 2012/0330530 | A1* | 12/2012 | Montvay | F02D 41/221 701/102 |
| 2015/0375735 | A1 | 12/2015 | Fischer et al. | |
| 2017/0051693 | A1* | 2/2017 | Szailer | F02D 41/0235 |

FOREIGN PATENT DOCUMENTS

| | | |
|---|---|---|
| DE | 10 2011 113 555 A1 | 3/2012 |
| DE | 10 2011 076 509 A1 | 11/2012 |
| DE | 10 2012 217 832 A1 | 4/2014 |
| WO | WO 2014/001053 A1 | 1/2014 |

OTHER PUBLICATIONS

International Search Report (PCT/ISA/210) issued in PCT Application No. PCT/EP2017/051287 dated Apr. 28, 2017 with English translation (eight pages).

German-language Written Opinion (PCT/ISA/237) issued in PCT Application No. PCT/EP2017/051287 dated Apr. 28, 2017 (seven pages).

German-language Search Report issued in counterpart German Application No. 10 2016 200 984.2 dated Sep. 9, 2016 with partial English translation (17 pages).

"Worldwide Emissions Standards Passenger Cars and Light Duty Vehicles", DELPHI Innovation for the Real World, Dec. 31, 2015, 106 pages, XP055363048.

"California Code of Regulations-1971.1 On-Board Diagnostic System Requirements—2010 and Subsequent Model-Year Heavy-Duty Engines, Section (4) In-Use Monitor Performance Ration Definition", WestlawNext, 2010, 10 pages.

* cited by examiner

METHOD FOR THE QUALITY ASSURANCE OF EXHAUST GAS BEHAVIOR IN A MOTOR VEHICLE

CROSS REFERENCE TO RELATED APPLICATIONS

This application is a continuation of PCT International Application No. PCT/EP2017/051287, filed Jan. 23, 2017, which claims priority under 35 U.S.C. § 119 from German Patent Application No. 10 2016 200 984.2, filed Jan. 25, 2016, the entire disclosures of which are herein expressly incorporated by reference.

BACKGROUND AND SUMMARY OF THE INVENTION

The present invention relates to a method for quality assurance of exhaust gas behavior in a motor vehicle, as well as to an apparatus and a motor vehicle in this regard.

In motor vehicles having internal combustion engines, what are known as onboard diagnoses are performed in order to be able to monitor exhaust-gas-relevant components and apparatuses.

For vehicles licensed in the USA, there is the legal requirement that a particular diagnosis frequency be ensured. In this case, the diagnosis frequency for the model year 2019 is being increased from 0.1 to 0.336 relative to the number of driving cycles.

Given the same driving behavior by the customer, OBD functions therefore need to run more than three times as often as previously. This can lead to difficulties, in particular with PHEVs.

There is therefore an increased risk of the demanded diagnosis frequencies no longer being complied with on average.

It would thus be desirable to provide an opportunity suitable for ensuring that the increased diagnosis frequency of diagnoses for exhaust-gas-relevant apparatuses can be complied with.

It is an object of the invention to propose an opportunity that avoids or at least reduces at least some of the disadvantages known in the prior art.

The object is achieved according to the invention by a method and a system according to embodiments of the invention.

According to the invention, a method is provided for quality assurance of an exhaust gas behavior in a motor vehicle, preferably in a hybrid motor vehicle, in particular in a plug-in hybrid motor vehicle. The method includes the following acts. Monitoring of an onboard diagnosis function of the motor vehicle, the onboard diagnosis function being relevant to the exhaust gas behavior of the motor vehicle. Providing a trip counter, the trip counter being indicative of a number of trips by the motor vehicle. Providing a diagnosis counter for that onboard diagnosis function of the motor vehicle that is affected by the monitoring. Providing a diagnosis frequency setpoint value. Incrementing the trip counter after the beginning of a driving cycle of the motor vehicle and a predetermined driving time of the motor vehicle. Forming a diagnosis frequency actual value, by use of a suitable combination of the diagnosis counter with the trip counter. Forming a difference between the diagnosis frequency setpoint value and the diagnosis frequency actual value. If the formed difference between the diagnosis frequency setpoint value and the diagnosis frequency actual value is below a difference threshold: selecting a control method from a control method group, each control method of the control method group being indicative of an applicable motor actuation of a drive motor of the motor vehicle. In this case, the selected control method is suitable for completing a currently running onboard diagnosis of the onboard diagnosis function successfully and initiating and completing a non-running onboard diagnosis of the onboard diagnosis function successfully. And the method also involves, after completion of the onboard diagnosis of the onboard diagnosis function: incrementing the diagnosis counter of the onboard diagnosis function, and resetting the motor actuation to an original motor actuation, according to a state before the selection of the control method.

The method steps can be carried out in automated fashion in this case.

An onboard diagnosis function within the context of the invention can in this case involve a process that performs a diagnosis of an exhaust-gas-relevant apparatus in order to check and/or log the operation of the exhaust-gas-relevant apparatus. In this case, there may be at least one applicable onboard diagnosis function provided for each exhaust-gas-relevant apparatus of the motor vehicle, for example.

A diagnosis frequency setpoint value within the context of the invention may in this case be a value that stipulates how often an applicable diagnosis is supposed to be performed successfully. The diagnosis frequency setpoint value may in this case be different for each diagnosis function. The diagnosis frequency setpoint value may in this case be the same for each diagnosis function.

The diagnosis frequency setpoint value may in this case be prescribed by a regulatory authority.

The diagnosis frequency setpoint value may in this case be a stipulated value.

A diagnosis frequency actual value within the context of the invention may in this case be a value that records how often an applicable diagnosis has been performed successfully.

The applicable performance frequency of the applicable diagnosis may in this case be indicated in a manner referenced to the number of driving cycles of the motor vehicle.

A predetermined driving time of the motor vehicle within the context of the invention may in this case be a period of time that needs to have elapsed so that a driving cycle is rated as such.

A difference threshold within the context of the invention may in this case mean a value that needs to be undershot or exceeded in order to perform or trigger a stipulated action. The difference threshold may in this case be a stipulated value.

The teaching according to the invention achieves the advantage that it is possible to ensure that a demanded diagnosis frequency for an applicable diagnosis function of the motor vehicle is complied with.

A further advantage is that this allows any malfunctions in exhaust-gas-relevant apparatuses of the motor vehicle to be detected within a stipulated number of driving cycles.

A further advantage is that an exhaust gas behavior can be checked persistently.

According to the invention, an apparatus is provided for quality assurance of an exhaust gas behavior in the motor vehicle, preferably in a hybrid motor vehicle, in particular in a plug-in hybrid motor vehicle. In this case, the apparatus includes the following functioning units. An onboard diagnosis apparatus, having an onboard diagnosis function, for an onboard diagnosis of a functional capability of an exhaust-gas-relevant apparatus of the motor vehicle. A monitoring apparatus, for monitoring the onboard diagnosis function of the onboard diagnosis apparatus of the motor vehicle. An apparatus for providing a trip counter, the trip counter being indicative of a number of driving cycles of the motor vehicle, wherein the apparatus for providing the trip counter is set up to allow incrementing of the trip counter. An apparatus for providing a diagnosis counter for that onboard diagnosis function of the motor vehicle, that is affected by the monitoring, wherein the apparatus for providing the diagnosis counter is set up to allow incrementing of the diagnosis counter of the onboard diagnosis function. An apparatus for providing a diagnosis frequency setpoint value. An apparatus for forming a diagnosis frequency actual value, by means of a suitable combination of the diagnosis counter with the trip counter. A comparison apparatus, for comparing the diagnosis frequency actual value with the diagnosis frequency setpoint value. A selection apparatus, for selecting a control method from a control method group, each control method of the control method group being indicative of an applicable motor actuation of a drive motor of the motor vehicle, and the selected control method being suitable for completing a currently running onboard diagnosis of the onboard diagnosis function successfully and initiating and completing a non-running onboard diagnosis of the onboard diagnosis function successfully. And an apparatus for resetting the motor actuation to an original motor actuation, according to a state before the selection of the control method. And in this case the apparatus is set up to carry out any method according to the invention.

The teaching according to the invention achieves the advantage that an apparatus can be provided that can be used to ensure that a demanded diagnosis frequency for an applicable diagnosis function of the motor vehicle is complied with.

A further advantage is that this allows any malfunctions in exhaust-gas-relevant apparatuses of the motor vehicle to be detected within a stipulated number of driving cycles.

A further advantage is that a retrofit apparatus can be provided for a motor vehicle, which can ensure that officially demanded diagnosis frequencies can be complied with.

A further advantage is that an exhaust gas behavior can be checked persistently.

A further advantage is that a diagnosis necessity check is effected before a diagnosis is kick-started.

According to the invention, a motor vehicle is provided having an apparatus according to the invention.

The teaching according to the invention achieves the advantage that a motor vehicle can be provided that can be used to ensure that a demanded diagnosis frequency for an applicable diagnosis function of the motor vehicle is complied with.

A further advantage is that this allows any malfunctions in exhaust-gas-relevant apparatuses of the motor vehicle to be detected within a stipulated number of driving cycles.

A further advantage is that a motor vehicle can be provided that can ensure that officially demanded diagnosis frequencies can be complied with.

A further advantage is that an exhaust gas behavior can be checked persistently.

According to the invention, a computer program product is provided for an apparatus according to the invention, wherein the apparatus is operable according to any method according to the invention.

The teaching according to the invention achieves the advantage that the method can be carried out in automated fashion particularly efficiently.

According to the invention, a data storage medium is provided having a computer program product according to the invention.

The teaching according to the invention achieves the advantage that the method can be distributed or provided to the apparatuses, systems and/or motor vehicles carrying out the method particularly efficiently.

Before configurations of the invention are described in more detail below, it should first of all be stated that the invention is not restricted to the components described or the method steps described. In addition, the terminology used is also not a limitation, but rather has a merely exemplary character. Where the singular is used in the description and the claims, this also covers the plural in each case, unless the context explicitly precludes this. Any method steps can, unless the context explicitly precludes it, be carried out in automated fashion. Applicable method sections can lead to applicable apparatus properties and vice versa, so that, unless the context explicitly precludes it, a change from a method feature to an apparatus feature is facilitated and vice versa.

Further exemplary configurations of the method according to the invention are explained below.

In accordance with a first exemplary configuration, the method further involves: monitoring a further onboard diagnosis function of the motor vehicle, the further onboard diagnosis function being relevant to the exhaust gas behavior of the motor vehicle. Providing a further diagnosis counter for the further onboard diagnosis function of the motor vehicle. Forming a further diagnosis frequency actual value, by means of a suitable combination of the further diagnosis counter with the trip counter. Forming a further difference between the diagnosis frequency setpoint value and the diagnosis frequency actual value. Forming a difference between the diagnosis frequency setpoint value and the further diagnosis frequency actual value. And, if the formed difference between the diagnosis frequency setpoint value and the further diagnosis frequency actual value is below a further difference threshold, the selection of the control method from the control method group further involves that control method being selected that is additionally suitable for completing a currently running onboard diagnosis of the further onboard diagnosis function successfully, and initiating and completing a non-running onboard diagnosis of the further onboard diagnosis function successfully. And the method in this case further involves, after completion of the onboard diagnosis of the further onboard diagnosis function, incrementing the diagnosis counter of the further onboard diagnosis function.

This configuration has the advantage that an applicable control method can be provided for more than one onboard diagnosis function.

In accordance with a further exemplary configuration, the method further involves monitoring a current driving situation of the motor vehicle. In this case, the selecting of the control method from the control method group is effected based on the current driving situation. And further, the selecting of the control method from the control method group in this case is effected only if the monitoring of the current driving situation reveals that the current driving situation is suitable for completing a currently running onboard diagnosis of the onboard diagnosis function successfully and initiating and completing a non-running onboard diagnosis of the onboard diagnosis function successfully.

This configuration has the advantage that the selection of a control method for the diagnosis run runs a meaningfulness check in addition to a necessity check. This allows diagnoses to be started in a more meaningful way and allows control methods to be selected in a more meaningful way, in order to allow a complete diagnosis run for a diagnosis that is running and/or is to be started.

In accordance with a further exemplary configuration, the method further involves, if a currently running onboard diagnosis of the onboard diagnosis function is present, the selecting of the control method from the control method group being effected based on a diagnosis run status of the currently running onboard diagnosis of the onboard diagnosis function.

This configuration has the advantage that the control method to be selected takes into consideration a diagnosis that is currently already running.

In accordance with a further exemplary configuration, the method further involves the forming of the diagnosis frequency actual value involving a division of the diagnosis counter by the trip counter. And, if a further diagnosis frequency actual value is present, the forming of the further diagnosis frequency actual value involves a division of the further diagnosis counter by the trip counter.

This configuration has the advantage that the method is also performable for a diagnosis frequency setpoint ratio.

In accordance with a further exemplary configuration, the method further involves the applicable onboard diagnosis of the onboard diagnosis function or of the further onboard diagnosis function involving a diagnosis of a functional capability of an exhaust-gas-relevant apparatus of the motor vehicle.

This configuration has the advantage that correct operation of an exhaust-gas-relevant apparatus can be monitored.

In accordance with a further exemplary configuration, the method further involves the control method group comprising: a propulsion control method, for requesting propulsion shutdown and/or propulsion startup of a drive apparatus and/or of a further drive apparatus of the motor vehicle. And/or a torque control method, for providing a torque range of the drive apparatus and/or of the further drive apparatus of the motor vehicle as required for the onboard diagnosis. And/or a speed control method, for limiting a speed range of the motor vehicle as required for the onboard diagnosis, in which speed range the drive apparatus and/or the further drive apparatus of the motor vehicle can provide an applicable power. And/or a load point shifting method, for shifting a load point of the drive apparatus and/or of the further drive apparatus of the motor vehicle. And/or a drive switching method, preventing switching-off and/or requesting switching-on of the drive apparatus and/or of the further drive apparatus of the motor vehicle.

The assignment of the method is supposed to be configurable by means of suitable application parameters.

This configuration has the advantage that various control methods can be used in order to ensure the demanded diagnosis frequency.

A further advantage is that, depending on the type of onboard diagnosis function, an applicable control method can be selected in order to ensure the demanded diagnosis frequency.

By way of example, the PCV diagnosis for detecting a leak in the tubing of the crank housing ventilation needs an internal combustion engine operating point with a very low load so that the leak does not become too small in proportion to the total air mass flow. A favorable ratio for these two air mass flows is achieved either when the internal combustion engine is idling, during fueled propulsion or during unfueled propulsion.

In accordance with a further exemplary configuration, the method further involves the propulsion control method for requesting propulsion shutdown being effected based on an automatic start/stop control system of the motor vehicle and/or on torque coordination of the drive apparatus with the further drive apparatus of the motor vehicle.

This configuration has the advantage that a propulsion control method can be used in order to be able to ensure the demanded diagnosis frequency even in unfavorable driving situations.

This configuration further has the advantage that a PCV diagnosis for detecting a leak in the tubing of the crank housing ventilation can be performed despite a driving situation which is actually unfavorable at present.

There follow a few associated driving situation examples:

Example 1: Present Driving Situation at Speeds >50 km/h and Battery State of Charge SOC>5%

Request for propulsion shutdown via the automatic start/stop control system and the torque coordination.
Behavior without request is: switch off the internal combustion engine Example 2: Present Driving Situation at Speeds >50 km/h and SOC<5%

Request for fueled propulsion via the automatic start/stop control system and limiting of the charging torque via the torque coordination
Behavior without request is: fueled propulsion with high charging torque, therefore no diagnosis run possible.

Example 3: Present Driving Situation Stop&go Mode

Request engine start and limitation of the charging torque while internal combustion engine idling.
Behavior without request is: internal combustion engine is off, or charges with high charging torque in the event of low SOCs.

By way of example, the catalytic converter diagnosis in internal combustion engine mode measures the oxygen storage capability of the engine catalytical converter. This can be effected only within a particular load window and when the cat temperature is sufficiently high.

In accordance with a further exemplary configuration, the method further involves the torque control method, for providing the torque range of the drive apparatus and/or of the further drive apparatus of the motor vehicle as required for the onboard diagnosis, being effected based on torque compensation by motor and/or by generator.

This configuration has the advantage that a torque control method can be used in order to be able to ensure the demanded diagnosis frequency even in the case of unfavorable driving situations.

This configuration further has the advantage that a catalytic converter diagnosis can be performed in internal combustion engine mode despite a driving situation that is actually unfavorable at present.

There follows an associated driving situation example:
Present driving situation at constant speed >50 km/h and vehicle is in charge sustaining mode.
Request for a desired torque window for the internal combustion engine. A minimum and a maximum torque at which the internal combustion engine can be operated are prescribed for the duration of the diagnosis. Compensation by motor or generator torque of the E-machine.

Behavior without request: diagnosis can be aborted as a result of load fluctuations.

In accordance with a further exemplary configuration, the method further involves the speed control method, for limiting a speed range of the motor vehicle as required for the onboard diagnosis, in which speed range the drive apparatus and/or the further drive apparatus of the motor vehicle can provide an applicable power, being effected based on limiting of a maximum speed of travel of an electric drive as drive apparatus or further drive apparatus and/or on limiting of a maximum speed of travel of an internal combustion drive as drive apparatus or further drive apparatus.

This configuration has the advantage that a speed control method can be used in order to be able to ensure the demanded diagnosis frequency even in unfavorable driving situations.

There follows an associated driving situation example:

Present driving situation at constant speed >50 km/h and vehicle is in charge depleting mode.

Request for a temporarily reduced maximum E-speed-of-travel so that the diagnosis can run in internal combustion engine mode.

Behavior without request: internal combustion engine is off and diagnosis cannot be performed.

By way of example the TEV diagnosis checks the tank ventilation valve and the lines connected thereto for leakage or a stuck valve. The first entry point operates by virtue of the underpressure in the aspirating engine mode of the internal combustion engine. The second entry point builds up an underpressure only in charged mode and can also only be diagnosed at these high operating points.

In accordance with a further exemplary configuration, the method further involves the load point shifting method for shifting the load point of the drive apparatus and/or of the further drive apparatus of the motor vehicle being effected based on load point raising or load point lowering of an internal combustion drive as drive apparatus or further drive apparatus.

This configuration has the advantage that a load point shifting method can be used in order to be able to ensure the demanded diagnosis frequency even in unfavorable driving situations.

There follows an associated driving situation example:

Present driving situation acceleration shortly before reaching the load threshold at which clearance for the diagnosis takes place.

Request for a load point rise, therefore charging of the battery, in order to raise the internal combustion engine load for a few seconds.

Behavior without request: the operating point of the internal combustion engine is too low to perform the diagnosis.

In accordance with a further exemplary configuration, the method further involves the drive apparatus of the motor vehicle having an internal combustion engine. Further, the further drive apparatus of the motor vehicle having an electric motor. And the method further involves the drive apparatus and/or the further drive apparatus being set up to provide an applicable drive power for a trip by the motor vehicle.

This configuration has the advantage that the method is employable for a hybrid motor vehicle.

In accordance with a further exemplary configuration, the method further involves the selected control method being abortable by an applicable action by the user of the motor vehicle, as a result of which the resetting of the motor actuation to the original motor actuation is initiated, according to the state before the selection of the control method.

This configuration has the advantage that the motor vehicle user can retain ultimate control over the drive behavior of his motor vehicle.

In accordance with a further exemplary configuration, the method further involves the selecting of the control method from the control method group involving a perceptibility of the applicable control method by the user of the motor vehicle being taken into consideration.

This configuration has the advantage that, depending on the situation, an applicable control method can be selected that limits at least the driving customs of the vehicle user, in order to ensure the demanded diagnosis frequency.

A further advantage is that, depending on the situation, an applicable best possible control method can be selected that in this case meets an optimum between a desire to limit the driving customs of a vehicle user as little as possible and the requirement to ensure an applicable diagnosis frequency.

The invention therefore allows a demanded diagnosis frequency for a diagnosis of an exhaust-gas-relevant apparatus that is present in a motor vehicle to be ensured. Further, the invention allows a demanded diagnosis frequency for an applicable diagnosis of any exhaust-gas-relevant apparatus of the motor vehicle to be ensured. In this case, an optimum control method, depending on the requirement, for a drive apparatus of the motor vehicle can be selected in order to ensure that an applicable diagnosis of an applicable exhaust-gas-relevant apparatus can be performed, that is to say completed, successfully in order to be able to ensure a demanded diagnosis frequency or to ensure that the demanded diagnosis frequency can be complied with on average, relative to prescribed permitted deviation values. Depending on how the difference threshold is stipulated, it is possible to ensure that a demanded diagnosis frequency is not undershot.

If the present situation therefore makes a diagnostic intervention appear necessary and meaningful, it is possible for the correct method for assisting the diagnosis run to be selected in target-oriented fashion.

The method for assisting the diagnosis run can in this case be selected on the basis of the present driving situation and the diagnosis to be assisted.

Therefore, a diagnosis manager can decide whether an intervention is necessary and also meaningful and can select a strategy consistent with the currently required diagnosis and the current driving situation of the motor vehicle. This strategy can first of all be split into a strategy by means of an automatic start/stop control system, also called SSA, of the applicable drive, torque coordination, that is to say battery state of charge control, also called SOC control, or an electric motor driving strategy, also called E-driving strategy. The strategy by means of SSA can involve a propulsion shutdown strategy, a shutdown prevention strategy or startup prompting strategy as a control method, for example. The SOC strategy can involve a fueled propulsion strategy and a desired torque window strategy as control methods, for example. The E-driving strategy can involve an E-driving manifestation strategy and a maximum E-speed-of-travel strategy as control methods, for example.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
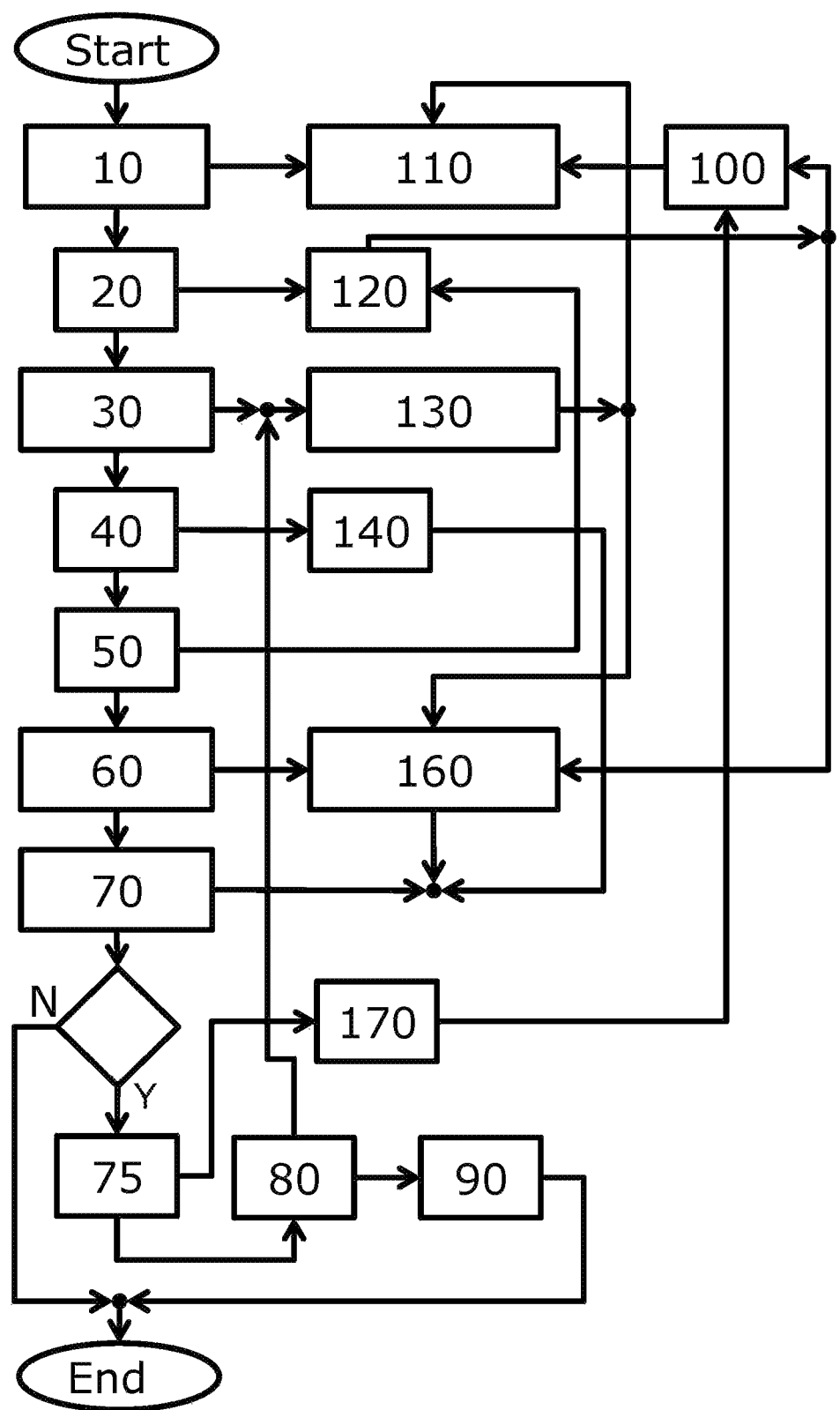
FIG. 1 shows a schematic depiction of a proposed method according to an exemplary configuration of the invention.

FIG. 1 shows a schematic depiction of a proposed method according to an exemplary configuration of the invention.

In this case, FIG. 1 shows a schematic depiction of a method for a motor vehicle, for quality assurance for an exhaust gas behavior in a motor vehicle 100, preferably in a hybrid motor vehicle, in particular in a plug-in hybrid motor vehicle. The method involves: monitoring 10 an onboard diagnosis function 110 of the motor vehicle 100, the onboard diagnosis function 110 being relevant to the exhaust gas behavior of the motor vehicle. Providing 20 a trip counter 120, the trip counter 120 being indicative of a number of trips by the motor vehicle 100. Providing 30 a diagnosis counter 130 for that onboard diagnosis function 110 of the motor vehicle 100 that is affected by the monitoring 10. Providing 40 a diagnosis frequency setpoint value 140. Incrementing 50 the trip counter 120 after the beginning of a driving cycle of the motor vehicle 100 and a predetermined driving time of the motor vehicle 100. Forming 60 a diagnosis frequency actual value 160, by means of a suitable combination of the diagnosis counter 130 with the trip counter 120. Forming 70 a difference between the diagnosis frequency setpoint value 140 and the diagnosis frequency actual value 160. And if the formed difference between the diagnosis frequency setpoint value 140 and the diagnosis frequency actual value 160 is below a difference threshold, the method further involves: selecting 75 a control method 170 from a control method group, each control method 170 of the control method group being indicative of an applicable motor actuation of a drive apparatus of the motor vehicle 100. In this case, the selected control method 170 is suitable for completing a currently running onboard diagnosis of the onboard diagnosis function 110 successfully and initiating and completing a non-running onboard diagnosis of the onboard diagnosis function 110 successfully. And after completion of the onboard diagnosis of the onboard diagnosis function 110, the method involves: incrementing 80 the diagnosis counter 130 of the onboard diagnosis function 110. And resetting 90 the motor actuation to an original motor actuation, according to a state before the selection of the control method 170.

Figure 2:
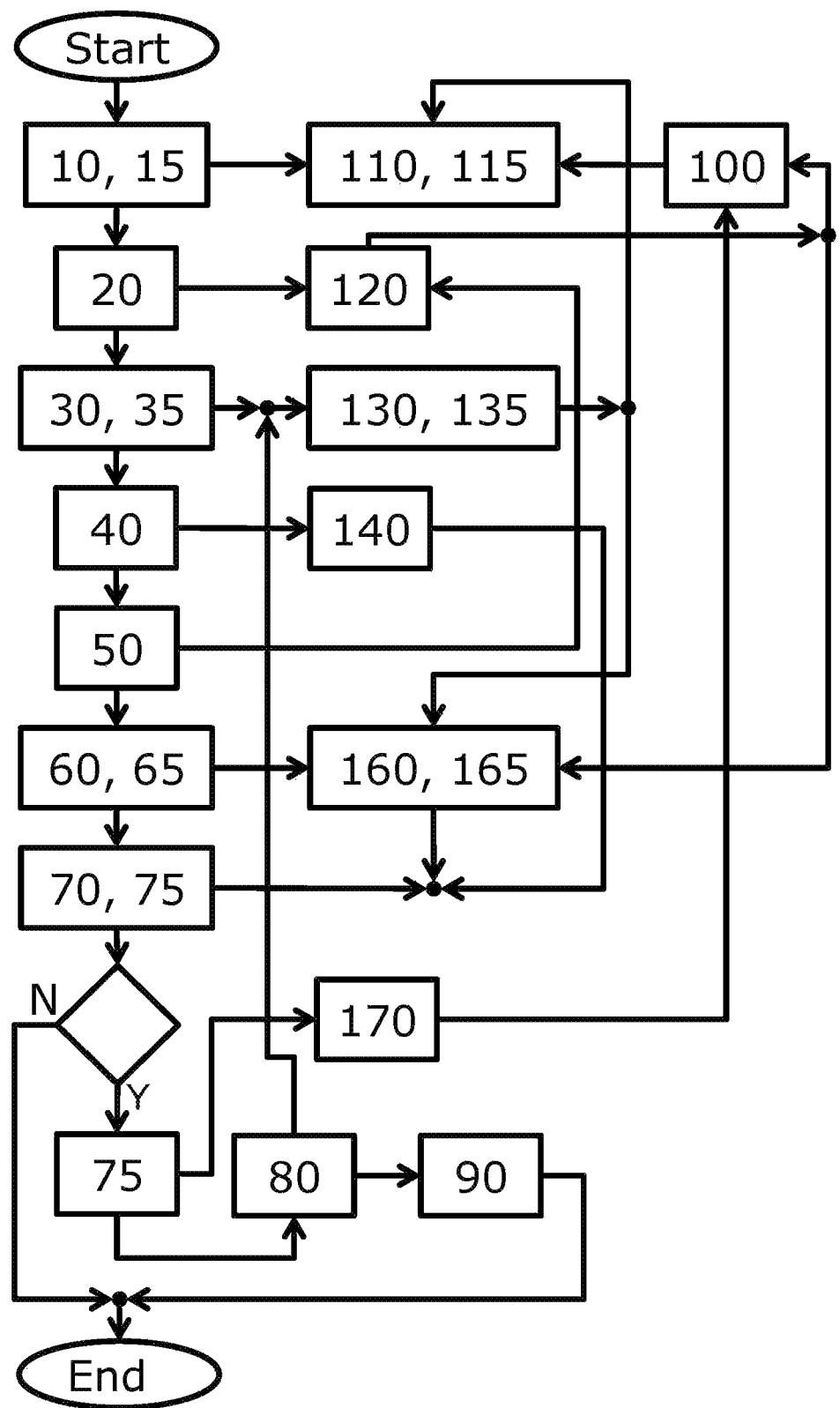
FIG. 2 shows a schematic depiction of a proposed method according to a further exemplary configuration of the invention.

FIG. 2 shows a schematic depiction of a proposed method according to a further exemplary configuration of the invention.

In this case, FIG. 2 shows a schematic depiction of a method that is developed further relative to FIG. 1. The statements made above for FIG. 1 therefore also continue to apply to FIG. 2.

FIG. 2 shows the method from FIG. 1, in which the method further involves: monitoring 15 a further onboard diagnosis function 115 of the motor vehicle 100, the further onboard diagnosis function 115 being relevant to the exhaust gas behavior of the motor vehicle 100. Providing 35 a further diagnosis counter 135 for the further onboard diagnosis function 115 of the motor vehicle 100. Forming 65 a further diagnosis frequency actual value 165, by means of a suitable combination of the further diagnosis counter 135 with the trip counter 120. Forming 75 a further difference between the diagnosis frequency setpoint value 140 and the further diagnosis frequency actual value 165. And if the formed further difference between the diagnosis frequency setpoint value 140 and the further diagnosis frequency actual value 165 is below a further difference threshold, the method further involves the selection 75 of the control method 170 from the control method group involving that control method being selected that is additionally suitable for completing a currently running onboard diagnosis of the further onboard diagnosis function 115 successfully, or initiating and completing a non-running onboard diagnosis of the further onboard diagnosis function 115 successfully. And the method further involves, after completion of the onboard diagnosis of the further onboard diagnosis function 115, incrementing 85 the further diagnosis counter 135 of the further onboard diagnosis function 115.

Figure 3:
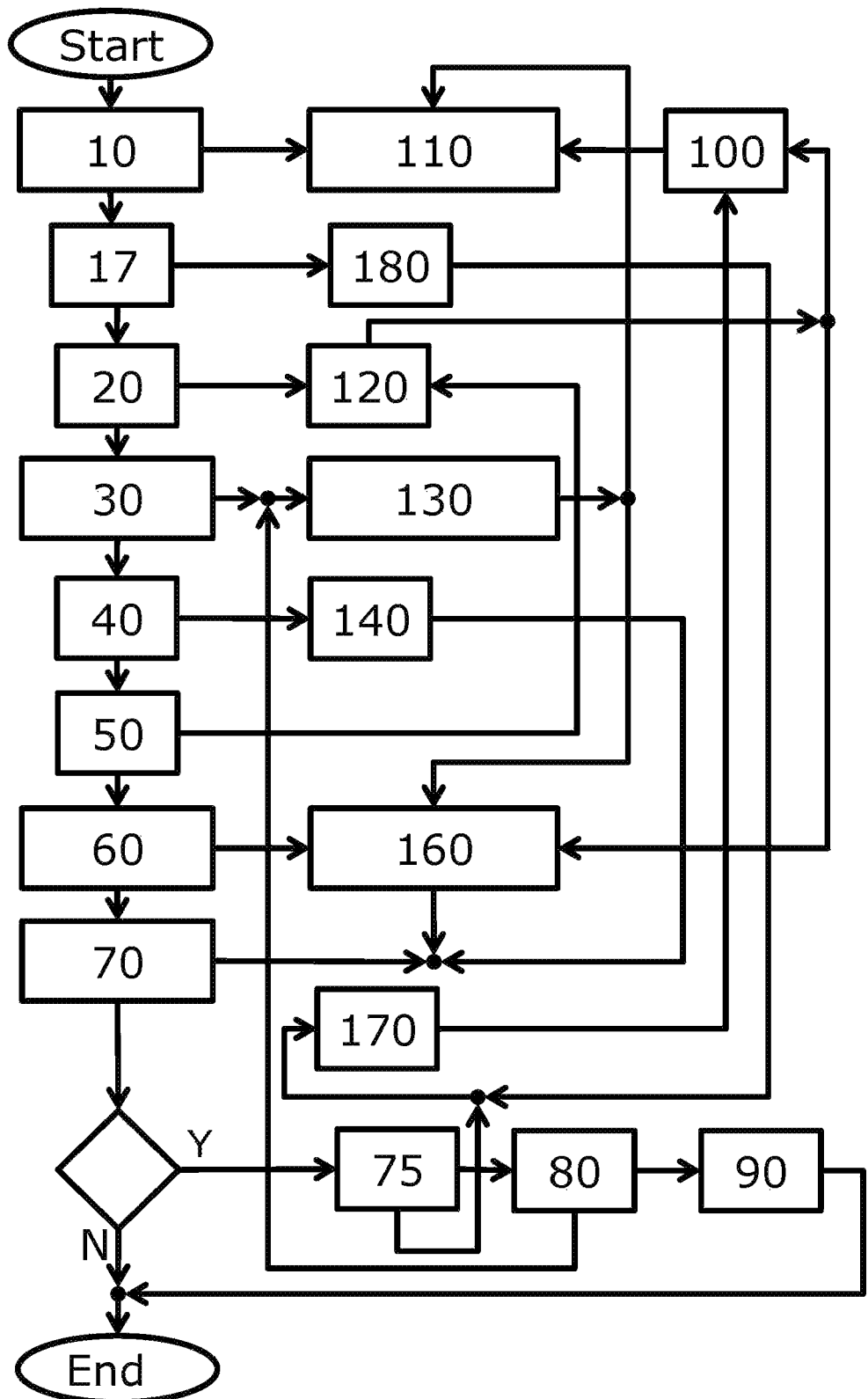
FIG. 3 shows a schematic depiction of a proposed method according to a further exemplary configuration of the invention.

FIG. 3 shows a schematic depiction of a proposed method according to a further exemplary configuration of the invention.

In this case, FIG. 3 shows a schematic depiction of a method that is developed further relative to FIG. 1 and FIG. 2. The statements above for FIG. 1 and FIG. 2 therefore also continue to apply to FIG. 3.

FIG. 3 shows the method from FIG. 1, in which the method further involves: monitoring 17 a current driving situation 180 of the motor vehicle 100. In this case, wherein the selecting 75 of the control method 170 from the control method group is effected based on the current driving situation 180. And in this case the selecting 75 of the control method 170 from the control method group is effected only if the monitoring 17 of the current driving situation 180 reveals that the current driving situation 180 is suitable for completing a currently running onboard diagnosis of the onboard diagnosis function 110 successfully and initiating and completing a non-running onboard diagnosis of the onboard diagnosis function 110 successfully.

Figure 4:
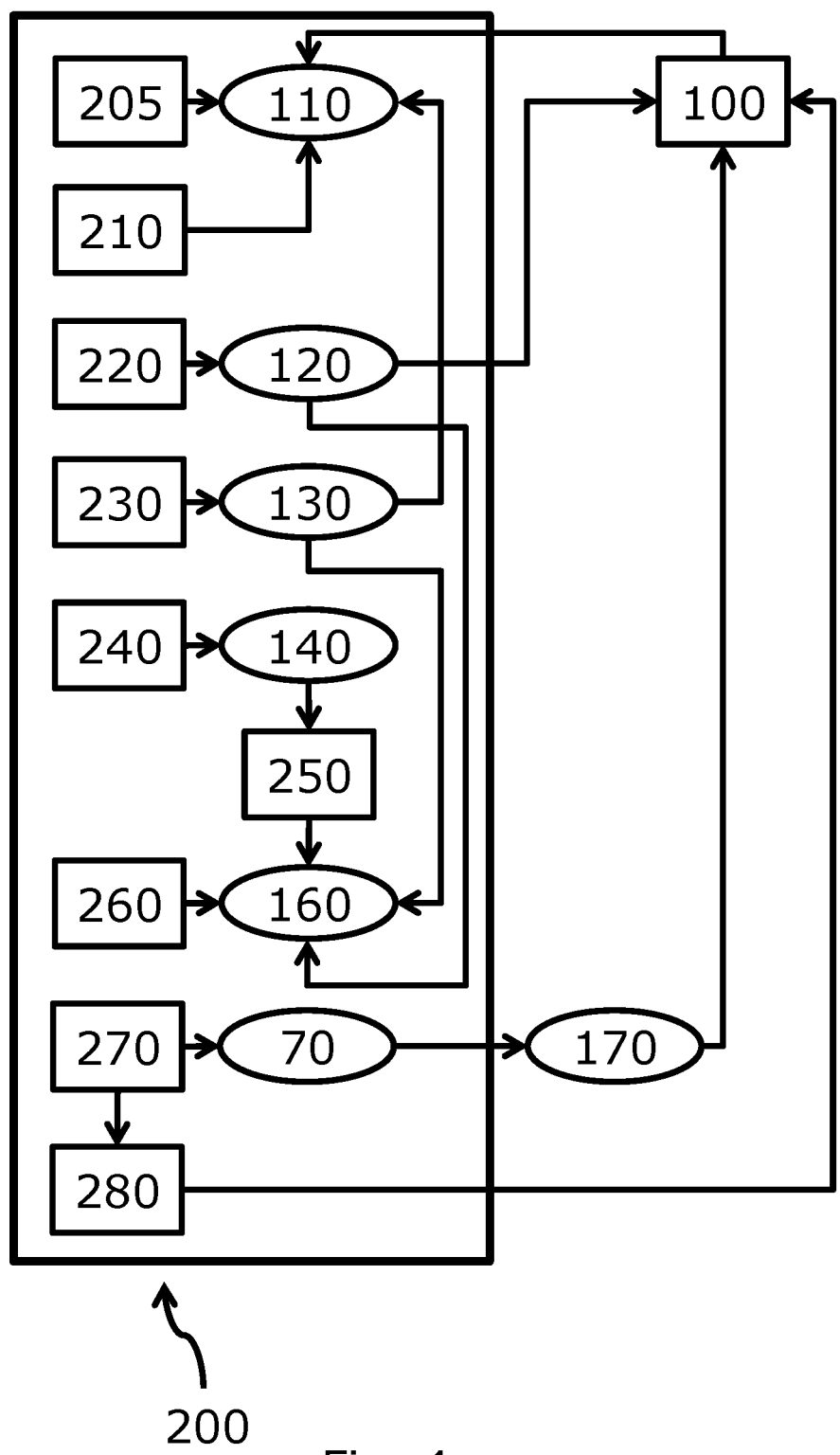
FIG. 4 shows a schematic depiction of a proposed apparatus according to a further exemplary configuration of the invention.

FIG. 4 shows a schematic depiction of a proposed apparatus according to a further exemplary configuration of the invention.

In this case, FIG. 4 shows a schematic depiction of a proposed apparatus 200 for quality assurance for an exhaust gas behavior in a motor vehicle 100, preferably in a hybrid motor vehicle, in particular in a plug-in hybrid motor vehicle. The apparatus has: an onboard diagnosis apparatus 205, having an onboard diagnosis function 110, for an onboard diagnosis of a functional capability of an exhaust-gas-relevant apparatus of the motor vehicle 100. A monitoring apparatus 210, for monitoring the onboard diagnosis function 110 of the onboard diagnosis apparatus 205 of the motor vehicle 100. An apparatus 220 for providing a trip counter 120, the trip counter 120 being indicative of a number of driving cycles of the motor vehicle 100. In this case, the apparatus 220 for providing the trip counter 120 is set up to allow incrementing of the trip counter 120. Further, the apparatus 200 for quality assurance for an exhaust gas behavior in a motor vehicle has an apparatus 230 for providing a diagnosis counter 130 for that onboard diagnosis function 110 of the motor vehicle 100 that is affected by the monitoring 10. In this case, the apparatus 230 for providing the diagnosis counter 130 is set up to allow incrementing of the diagnosis counter 130 of the onboard diagnosis function 110. Further, the apparatus 200 for quality assurance for an exhaust gas behavior in a motor vehicle has: an apparatus 240 for providing a diagnosis frequency setpoint value 140. An apparatus 260 for forming a diagnosis frequency actual value 160, by means of a suitable combination of the diagnosis counter 130 with the trip counter 120. A comparison apparatus 250, for comparing the diagnosis frequency actual value 160 with the diagnosis frequency setpoint value 140. A selection apparatus 270, for selecting 70 a control method 170 from a control method group, each control method 170 of the control method group being indicative of an applicable motor actuation of a drive motor of the motor vehicle 100. And in this case, the selected control method 170 is suitable for completing a currently running onboard diagnosis of the onboard diagnosis function 110 successfully and initiating and completing a non-running onboard diagnosis of the onboard diagnosis function 110 successfully. And further, the apparatus 200 for quality assurance for an exhaust gas behavior in a motor vehicle has an apparatus 280 for resetting the motor actuation to an original motor actuation, according to a state before the selection 70 of the control method 170. And in this case, the apparatus 200 for quality assurance for an exhaust gas behavior in a motor vehicle is set up to carry out any method according to the invention.

Figure 5:
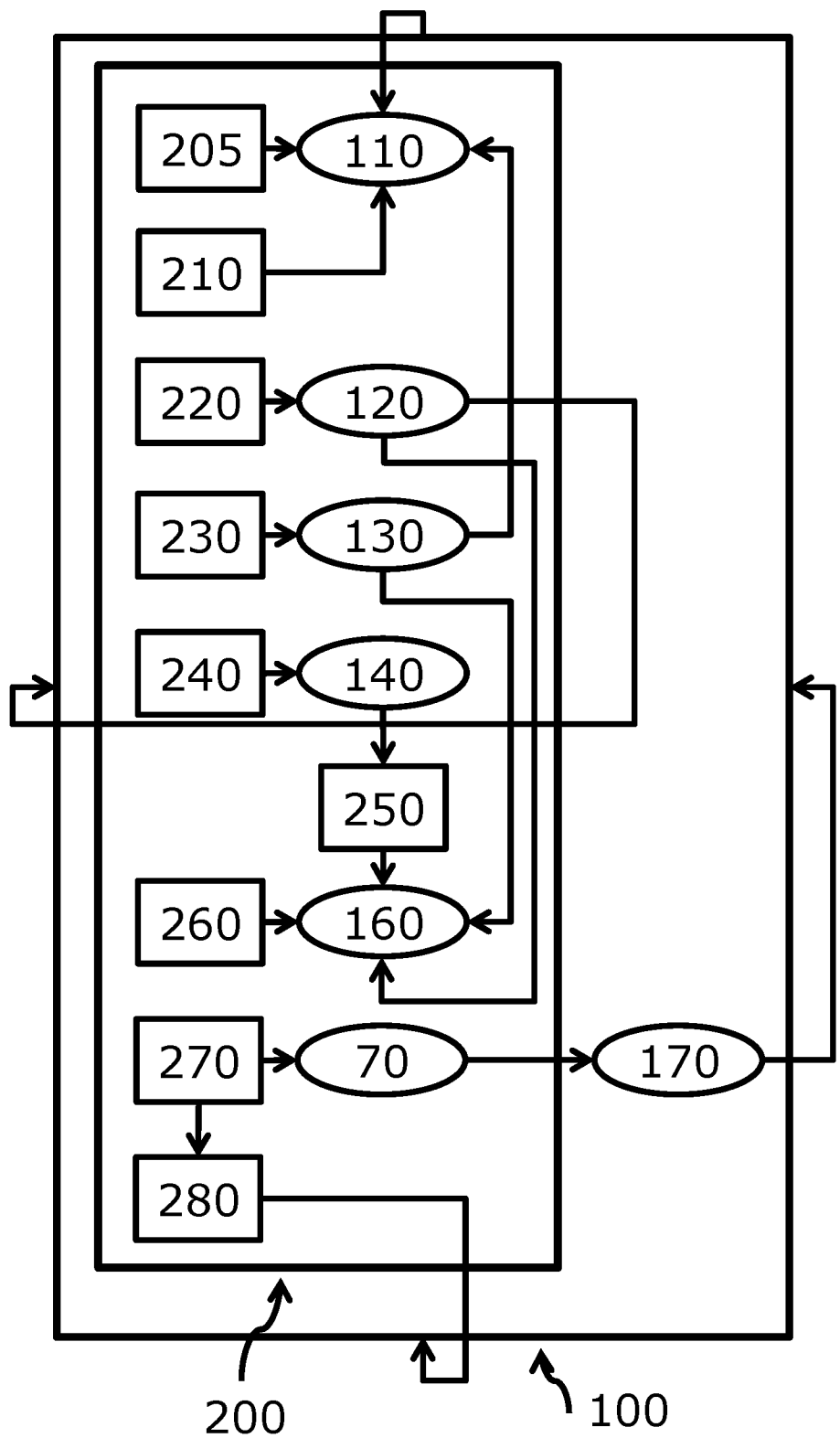
FIG. 5 shows a schematic depiction of a proposed motor vehicle according to a further exemplary configuration of the invention.

FIG. 5 shows a schematic depiction of a proposed motor vehicle according to a further exemplary configuration of the invention.

In this case, FIG. 5 shows a schematic depiction of a proposed motor vehicle 100. In this case, the motor vehicle 100 has an apparatus 200 according to the invention. The apparatus 200 is in this case set up to carry out any method according to the invention. In FIG. 5, the motor vehicle has the apparatus 200 from FIG. 4 by way of example.

The inventive concept can be summarized as follows. A method, an apparatus in that regard and a motor vehicle in that regard are provided, as a result of which it becomes possible to comply with a desired diagnosis frequency for a diagnosis on an exhaust-gas-relevant apparatus. Such a diagnosis frequency to be complied with can be demanded or stipulated or determined by an authority in this case.

An example in this case may be requirements of the US authority, which requires such diagnosis frequencies to always be complied with for every US vehicle licensing in every single year.

Therefore, the applicable US authority demands many onboard diagnosis functions in the vehicle, what are known as OBD functions. This is likewise a component part for plug-in hybrids, what are known as PHEVs.

OBD diagnoses have clearly defined clearance conditions or abort conditions. A diagnosis runs successfully if the demanded conditions are present for a minimum time.

For most diagnoses, the following conditions are relevant:
internal combustion engine mode
internal combustion engine operating point
fueled or unfueled propulsion of the internal combustion engine In the case of hybrid drives and in particular plug-in hybrid drives, limitations for these main conditions frequently arise, however. Electric driving stops internal combustion engine mode (ICE mode) or aborts it after a short time. The ICE load window is changed by constraints, such as SOC control, driver's requirement and the like, and the propulsion shutdown phases are dispensed with for the most part as a result of the internal combustion engine being switched off at high speeds already.

This is the precise point at which the diagnosis manager intervenes and assists the diagnosis manager by means of specific intervention in the operating strategy of the vehicle. In this case, the intervention makes a small influence on the vehicle behavior perceptible by the customer possible and at the same time allows a relevant increase in $CO_2$ emissions not to be caused. An example of such an operating strategy or of a control method in this case is what is known as the desired torque window as a torque control method: if the driver's requirement is above or below the load window of the diagnosis, the diagnosis is aborted, and then for the most part has to start again from.

Temporary torque limitation in the internal combustion engine allows this to be prevented. The difference between the driver's desired torque and ICE torque is then provided by a traction machine.

LIST OF REFERENCE SIGNS

10 Monitoring an onboard diagnosis function
15 Monitoring a further onboard diagnosis function
17 Monitoring a present driving situation of the motor vehicle
20 Providing a trip counter
30 Providing a diagnosis counter
35 Providing a further diagnosis counter
40 Providing a diagnosis frequency setpoint value
50 Incrementing the trip counter
60 Forming a diagnosis frequency actual value
65 Forming a further diagnosis frequency actual value
70 Forming a difference between the diagnosis frequency setpoint value and the diagnosis frequency actual value
75 Forming a further difference between the diagnosis frequency setpoint value and the further diagnosis frequency actual value
75 Selecting a control method
80 Incrementing the diagnosis counter
90 Resetting the motor actuation
100 Motor vehicle
110 Onboard diagnosis function
115 Further onboard diagnosis function
120 Trip counter
130 Diagnosis counter
135 Further diagnosis counter
140 Diagnosis frequency setpoint value
160 Diagnosis frequency actual value
165 Further diagnosis frequency actual value
170 Control method
180 Present driving situation
200 Apparatus for quality assurance for an exhaust gas behavior
205 Onboard diagnosis apparatus
210 Monitoring apparatus
220 Apparatus for providing a trip counter
230 Apparatus for providing a diagnosis counter
240 Apparatus for providing a diagnosis frequency setpoint value
250 Comparison apparatus
260 Apparatus for forming a diagnosis frequency actual value
270 Selection apparatus
280 Apparatus for resetting the motor actuation The foregoing disclosure has been set forth merely to illustrate the invention and is not intended to be limiting.

Since modifications of the disclosed embodiments incorporating the spirit and substance of the invention may occur to persons skilled in the art, the invention should be construed to include everything within the scope of the appended claims and equivalents thereof.

What is claimed is:

1. A method for quality assurance of an exhaust gas behavior in a motor vehicle, the method comprising the steps of:
monitoring an onboard diagnosis function of the motor vehicle, the onboard diagnosis function being relevant to the exhaust gas behavior of the motor vehicle;
providing a trip counter, the trip counter being indicative of a number of trips by the motor vehicle;
providing a diagnosis counter for that onboard diagnosis function of the motor vehicle that is affected by the monitoring;
providing a diagnosis frequency setpoint value;
incrementing the trip counter after beginning a driving cycle of the motor vehicle and a predetermined driving time of the motor vehicle;
forming a diagnosis frequency actual value, by use of a suitable combination of the diagnosis counter with the trip counter;
forming a difference between the diagnosis frequency setpoint value and the diagnosis frequency actual value;
if the formed difference between the diagnosis frequency setpoint value and the diagnosis frequency actual value is below a difference threshold:
selecting a control method from a control method group, each control method of the control method group being indicative of an applicable motor actuation of a drive apparatus of the motor vehicle, wherein
the selected control method is suitable for completing a currently running onboard diagnosis of the onboard diagnosis function successfully and initiating and completing a non-running onboard diagnosis of the onboard diagnosis function successfully, and
after completion of the onboard diagnosis of the onboard diagnosis function:
incrementing the diagnosis counter of the onboard diagnosis function; and
resetting the motor actuation to an original motor actuation, according to a state before the selection of the control method.

2. The method as claimed in claim 1, the method further comprising the steps of:
monitoring a further onboard diagnosis function of the motor vehicle, the further onboard diagnosis function being relevant to the exhaust gas behavior of the motor vehicle;
providing a further diagnosis counter for the further onboard diagnosis function of the motor vehicle;
forming a further diagnosis frequency actual value, by means of a suitable combination of the further diagnosis counter with the trip counter;
forming a further difference between the diagnosis frequency setpoint value and the further diagnosis frequency actual value;
if the formed further difference between the diagnosis frequency setpoint value and the further diagnosis frequency actual value is below a further difference threshold:
the selection of the control method from the control method group involving that control method being selected that is additionally suitable for completing a currently running onboard diagnosis of the further onboard diagnosis function successfully, and initiating and completing a non-running onboard diagnosis of the further onboard diagnosis function successfully, and
incrementing the further diagnosis counter of the further onboard diagnosis function after completion of the onboard diagnosis of the further onboard diagnosis function.

3. The method as claimed in claim 1, the method further comprising the step of:
monitoring a current driving situation of the motor vehicle, wherein the selecting of the control method from the control method group is effected based on the current driving situation, and in this case the selecting of the control method from the control method group is effected only if the monitoring of the current driving situation reveals that the current driving situation is suitable for completing a currently running onboard diagnosis of the onboard diagnosis function successfully and initiating and completing a non-running onboard diagnosis of the onboard diagnosis function successfully.

4. The method as claimed in claim 1, wherein
if a currently running onboard diagnosis of the onboard diagnosis function is present, the selecting of the control method from the control method group is effected based on a diagnosis run status of the currently running onboard diagnosis of the onboard diagnosis function.

5. The method as claimed in claim 1, wherein
the forming of the diagnosis frequency actual value involves a division of the diagnosis counter by the trip counter, and,
if a further diagnosis frequency actual value is present, the forming of the further diagnosis frequency actual value involves a division of the further diagnosis counter by the trip counter.

6. The method as claimed in claim 1, wherein
the applicable onboard diagnosis of the onboard diagnosis function or of the further onboard diagnosis function involves a diagnosis of a functional capability of an exhaust gas relevant apparatus of the motor vehicle.

7. The method as claimed in claim 1, wherein
the control method group comprises one or more of:
a propulsion control method, for requesting propulsion shutdown and/or propulsion startup of the drive apparatus and/or of a further drive apparatus of the motor vehicle,
a torque control method, for providing a torque range of the drive apparatus and/or of the further drive apparatus of the motor vehicle as required for the onboard diagnosis, and/or
a speed control method, for limiting a speed range of the motor vehicle as required for the onboard diagnosis, in which speed range the drive apparatus and/or the further drive apparatus of the motor vehicle can provide an applicable power,
a load point shifting method, for shifting a load point of the drive apparatus and/or of the further drive apparatus of the motor vehicle, or
a drive switching method, preventing switching off and/or requesting switching on of the drive apparatus and/or of the further drive apparatus of the motor vehicle.

8. The method as claimed in claim 7, wherein
the propulsion control method for requesting propulsion shutdown is effected based on an automatic start/stop control system of the motor vehicle and/or on torque coordination of the drive apparatus with the further drive apparatus of the motor vehicle.

9. The method as claimed in claim 7, wherein the torque control method, for providing the torque range of the drive apparatus and/or of the further drive apparatus of the motor vehicle as required for the onboard diagnosis, is effected based on torque compensation by motor and/or by generator.

10. The method as claimed in claim 7, wherein the speed control method, for limiting a speed range of the motor vehicle as required for the onboard diagnosis, in which speed range the drive apparatus and/or the further drive apparatus of the motor vehicle can provide an applicable power, is effected based on limiting of a maximum speed of travel of an electric drive as drive apparatus or further drive apparatus and/or on limiting of a maximum speed of travel of an internal combustion drive as drive apparatus or further drive apparatus.

11. The method as claimed in claim 7, wherein the load point shifting method for shifting the load point of the drive apparatus and/or of the further drive apparatus of the motor vehicle is effected based on load point raising or load point lowering of an internal combustion drive as drive apparatus or further drive apparatus.

12. The method as claimed in claim 7, wherein the drive apparatus of the motor vehicle has an internal combustion engine,
the further drive apparatus of the motor vehicle has an electric motor, and
the drive apparatus and/or the further drive apparatus is set up to provide an applicable drive power for a trip by the motor vehicle.

13. The method as claimed in claim 1, wherein the selected control method is abortable by an applicable action by a user of the motor vehicle, as a result of which the resetting of the motor actuation to the original motor actuation is initiated, according to the state before the selection of the control method.

14. The method as claimed in claim 1, wherein the selecting of the control method from the control method group involves a perceptibility of the applicable control method by a user of the motor vehicle being taken into consideration.

15. The method as claimed in claim 1, wherein the method for quality assurance of the exhaust gas behavior is carried out in a plug-in hybrid motor vehicle.

16. An apparatus for quality assurance for an exhaust gas behavior in a motor vehicle, the apparatus comprising:
an onboard diagnosis apparatus, having an onboard diagnosis function, for an onboard diagnosis of a functional capability of an exhaust gas relevant apparatus of the motor vehicle;
a monitoring apparatus, for monitoring the onboard diagnosis function of the onboard diagnosis apparatus of the motor vehicle;
a trip computer apparatus for providing a trip counter, the trip counter being indicative of a number of driving cycles of the motor vehicle, wherein the trip computer apparatus is set up to allow incrementing of the trip counter;
a diagnosis computer apparatus for providing a diagnosis counter for that onboard diagnosis function of the motor vehicle, that is affected by the monitoring, wherein the diagnosis counter apparatus is set up to allow incrementing of the diagnosis counter (130) of the onboard diagnosis function;
a diagnosis frequency set point value apparatus for providing a diagnosis frequency setpoint value;
a diagnosis frequency actual value apparatus for forming a diagnosis frequency actual value, by use of a suitable combination of the diagnosis counter with the trip counter;
a comparison apparatus, for comparing the diagnosis frequency actual value with the diagnosis frequency setpoint value;
a selection apparatus, for selecting a control method from a control method group, each control method of the control method group being indicative of an applicable motor actuation of a drive motor of the motor vehicle, and the selected control method being suitable for completing a currently running onboard diagnosis of the onboard diagnosis function successfully and initiating and completing a non-running onboard diagnosis of the onboard diagnosis function successfully; and
a resetting apparatus for resetting the motor actuation to an original motor actuation, according to a state before the selection of the control method.

17. The apparatus as claimed in claim 16, wherein the apparatus is provided for a plug-in hybrid motor vehicle.

18. A motor vehicle, comprising an apparatus as claimed in claim 16.

19. The motor vehicle as claimed in claim 18, wherein the motor vehicle is a plug-in hybrid motor vehicle.

20. A computer program product comprising a non-transitory computer readable medium having stored thereon program code that, when executed by a processor, carries out the acts of:
monitoring an onboard diagnosis function of the motor vehicle, the onboard diagnosis function being relevant to the exhaust gas behavior of the motor vehicle;
providing a trip counter, the trip counter being indicative of a number of trips by the motor vehicle;
providing a diagnosis counter for that onboard diagnosis function of the motor vehicle that is affected by the monitoring;
providing a diagnosis frequency setpoint value;
incrementing the trip counter after beginning a driving cycle of the motor vehicle and a predetermined driving time of the motor vehicle;
forming a diagnosis frequency actual value, by use of a suitable combination of the diagnosis counter with the trip counter;
forming a difference between the diagnosis frequency setpoint value and the diagnosis frequency actual value;
if the formed difference between the diagnosis frequency setpoint value and the diagnosis frequency actual value is below a difference threshold:
selecting a control method from a control method group, each control method of the control method group being indicative of an applicable motor actuation of a drive apparatus of the motor vehicle, wherein
the selected control method is suitable for completing a currently running onboard diagnosis of the onboard diagnosis function successfully and initiating and completing a non-running onboard diagnosis of the onboard diagnosis function successfully, and after completion of the onboard diagnosis of the onboard diagnosis function:
   incrementing the diagnosis counter of the onboard diagnosis function; and
resetting the motor actuation to an original motor actuation, according to a state before the selection of the control method.

\* \* \* \* \*